US011163849B2

(12) United States Patent
Ruvini

(10) Patent No.: US 11,163,849 B2
(45) Date of Patent: *Nov. 2, 2021

(54) IDENTIFICATION OF CONTENT IN AN ELECTRONIC DOCUMENT

(71) Applicant: eBay Inc., San Jose, CA (US)

(72) Inventor: Jean-David Ruvini, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,131

(22) Filed: Oct. 2, 2019

(65) Prior Publication Data

US 2020/0104328 A1 Apr. 2, 2020

Related U.S. Application Data

(63) Continuation of application No. 15/147,468, filed on May 5, 2016, now Pat. No. 10,452,737, which is a continuation of application No. 13/663,070, filed on Oct. 29, 2012, now Pat. No. 9,355,087, which is a continuation of application No. 11/956,687, filed on Dec. 14, 2007, now Pat. No. 8,301,998.

(51) Int. Cl.
| *G06F 40/258* | (2020.01) |
| *G06F 16/957* | (2019.01) |
| *G06F 16/958* | (2019.01) |
| *G06F 40/143* | (2020.01) |

(52) U.S. Cl.
CPC .......... *G06F 16/957* (2019.01); *G06F 16/958* (2019.01); *G06F 40/143* (2020.01); *G06F 40/258* (2020.01)

(58) Field of Classification Search
CPC .......... G06F 17/30899; G06F 17/2247; G06F 17/27; G06F 17/2745; G06F 17/3089; G06F 16/957; G06F 40/258; G06F 40/143

See application file for complete search history.

(56) References Cited

U.S. PATENT DOCUMENTS

| 6,601,222 B1 * | 7/2003 | Mehrotra .............. G06F 30/367 716/115 |
| 6,880,122 B1 | 4/2005 | Lee et al. |
| 7,613,995 B2 | 11/2009 | Wen et al. |

(Continued)

OTHER PUBLICATIONS

Yi et al., "Eliminating Noisy Information in Web Pages for Data Mining", Retrieved from the internet URL:<http://citeseerx.ist.psu.edu/viewdoc/download?doi=10.1.1.4.4087&rep=rep1&type=pdf?, 2003, 10 pages.

(Continued)

*Primary Examiner* — Kyle R Stork
(74) *Attorney, Agent, or Firm* — Holland & Hart LLP

(57) ABSTRACT

In some embodiments, a method includes receiving an electronic document that comprises a plurality of sections. The method includes marking the plurality of sections as a content section or a non-content section using a visual attribute of the sections that includes at least one of a width of the section, a density of the plurality of hyperlinks in the section, a size of a font of text in the section and whether a title of the electronic document overlaps with text in the section. The method also includes storing the marking of the plurality of sections of the electronic document in a machine-readable medium.

20 Claims, 7 Drawing Sheets

(56) References Cited

U.S. PATENT DOCUMENTS

| | | | | |
|---|---|---|---|---|
| 8,301,998 | B2* | 10/2012 | Ruvini | G06F 16/957 715/243 |
| 9,355,087 | B2* | 5/2016 | Ruvini | G06F 16/957 |
| 10,452,737 | B2* | 10/2019 | Ruvini | G06F 40/14 |
| 2004/0013302 | A1 | 1/2004 | Ma et al. | |
| 2004/0268303 | A1* | 12/2004 | Abe | G06F 8/74 717/108 |
| 2005/0028077 | A1 | 2/2005 | Wen et al. | |
| 2005/0066269 | A1 | 3/2005 | Wang et al. | |
| 2006/0002623 | A1 | 1/2006 | Dolan et al. | |
| 2006/0106798 | A1 | 5/2006 | Wen et al. | |
| 2007/0050708 | A1 | 3/2007 | Gupta et al. | |
| 2007/0220421 | A1 | 9/2007 | Sharpe et al. | |
| 2008/0139191 | A1* | 6/2008 | Melnyk | G06F 16/9577 455/419 |
| 2008/0275901 | A1 | 11/2008 | Chakrabarti et al. | |
| 2009/0158138 | A1 | 6/2009 | Ruvini | |
| 2010/0198827 | A1 | 8/2010 | Yacoub et al. | |
| 2013/0055075 | A1 | 2/2013 | Ruvini | |
| 2016/0246894 | A1 | 8/2016 | Ruvini | |

OTHER PUBLICATIONS

Final Office Action received for U.S. Appl. No. 11/956,687, dated Jun. 30, 2011, 18 pages.
Non-Final Office Action received for U.S. Appl. No. 11/956,687, dated Dec. 30, 2011, 17 pages.
Non-Final Office Action received for U.S. Appl. No. 11/956,687, dated Jan. 20, 2011, 17 pages.
Notice of Allowance received for U.S. Appl. No. 11/956,687, dated Jun. 26, 2012, 7 pages.
Response to Final Office Action filed on Sep. 16, 2011, for U.S. Appl. No. 11/956,687, dated Jun. 30, 2011, 11 pages.
Response to Non-Final Office Action filed on Apr. 25, 2011, for U.S. Appl. No. 11/956,687, dated Jan. 20, 2011, 16 pages.
Response to Non-Final Office Action filed on Apr. 30, 2012, for U.S. Appl. No. 11/956,687, dated Dec. 30, 2011, 11 pages.
Applicant Initiated Interview Summary received for U.S. Appl. No. 13/663,070, dated Jun. 10, 2015, 3 pages.
Final Office Action received for U.S. Appl. No. 13/663,070, dated Oct. 8, 2015, 8 pages.
Non-Final Office Action received for U.S. Appl. No. 13/663,070, dated May 18, 2015, 8 pages.
Notice of Allowance received for U.S. Appl. No. 13/663,070, dated Feb. 5, 2016, 5 pages.
Response to Final Office Action filed on Jan. 8, 2016, for U.S. Appl. No. 13/663,070, dated Oct. 8, 2015, 8 pages.
Response to Non-Final Office Action filed on Aug. 18, 2015, for U.S. Appl. No. 13/663,070, dated May 18, 2015, 7 pages.
Cai et al., "Extracting Content Structure for Web Pages based on Visual Representation", Retrieved from the internet URL:<http://citeseerx.ist.psu.edu/viewdoc/download?doi=10.1.1.85.3169&rep=rep1&type=pdf>, 2003, 1-12 pages.
Cai et al., "VIPS: a Vision-based Page Segmentation Algorithm", Retrieved from the internet URL:<https://www.microsoft.com/en-us/research/wp-content/uploads/2016/02/tr-2003-79.pdf>, Nov. 2003, 1-29 pages.
Kao et al., "WISDOM: Web intrapage informative structure mining based on document object model", IEEE Transactions on Knowledge and Data Engineering, vol. 17, Issue 5, May 2005, 37 pages.
Kovačevič et al., "Searching for Web Information More Efficiently Using Presentational Layout Analysis", Int. J. Electronic Business, vol. 1, No. 3,, 2003, pp. 310-326.
Lin et al., "Discovering Informative Content Blocks from Web documents", Retrieved from the internet URL:<http://citeseerx.ist.psu.edu/viewdoc/download?doi=10.1.1.18.7133&rep=rep1&type=pdf>, 2002, 6 pages.
Song et al., "Learning Block Importance Models for Web Pages", Proceedings of the 13th International Conference on World Wide Web, 2004, 9 pages.
Yi et al., "Web Page Cleaning for Web Mining through Feature Weighting", Retrieved from the internet URL:<https://pdfs.semanticscholar.org/4553/beacaf59c0aea798ff02568d09d96d9173b2.pdf>, Aug. 2003, 1-6 pages.
Advisory Action received for U.S. Appl. No. 15/147,468, dated Jul. 16, 2018, 5 pages.
Applicant Initiated Interview Summary received for U.S. Appl. No. 15/147,468, dated Jan. 18, 2018, 5 pages.
Applicant Initiated Interview Summary received for U.S. Appl. No. 11/956,687, dated Sep. 22, 2011, 3 pages.
Final Office Action Received for U.S. Appl. No. 15/147,468 dated Apr. 25, 2018, 20 pages.
Non-Final Office Action received for U.S. Appl. No. 15/147,468, dated Oct. 20, 2017, 22 pages.
Non-Final Office Action received for U.S. Appl. No. 15/147,468, dated Sep. 14, 2018, 14 pages.
Notice of Allowance received for U.S. Appl. No. 15/147,468, dated Feb. 12, 2019, 5 pages.
Notice of Allowance received for U.S. Appl. No. 15/147,468, dated Jun. 19, 2019, 5 pages.
Preliminary Amendment filed for U.S. Appl. No. 15/147,468, dated Jun. 9, 2016, 7 pages.
Response to Final Office Action filed on Jun. 28, 2018, for U.S. Appl. No. 15/147,468, dated Apr. 25, 2018, 14 pages.
Response to Non-Final Office Action filed on Jan. 22, 2018, for U.S. Appl. No. 15/147,468, dated Oct. 20, 2017, 15 pages.
Response to Non-Final Office Action filed on Nov. 29, 2018, for U.S. Appl. No. 15/147,468, dated Sep. 14, 2018, 3 pages.
Examiner Initiated Interview Summary received for U.S. Appl. No. 15/147,468, dated Jul. 16, 2018, 1 pages.

* cited by examiner

IDENTIFICATION OF CONTENT IN AN ELECTRONIC DOCUMENT

CROSS REFERENCE OF RELATED APPLICATIONS

This application is a continuation of and claims the benefit of priority to U.S. patent application Ser. No. 15/147,468, filed May 5, 2016, which is a continuation of and claims the benefit of priority to U.S. patent application Ser. No. 13/663,070, filed Oct. 29, 2012, which is a continuation of and claims the benefit of priority to U.S. patent application Ser. No. 11/956,687, filed Dec. 14, 2007, which applications are incorporated herein by reference in their entireties.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright 2007, eBay Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A number of applications process the content of a web page for a number of different uses. One such application is a search engine. Search engines enable searches for data across various Web sites and associated pages that are hosted on any device on an accessible network (e.g., the Internet and networks coupled thereto). Search engines (as well as other applications) generally only need to process the actual content of a web page. Such applications do not need to process non-content of a web page (such as advertisements, navigation panels, copyrights notices, etc.).

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
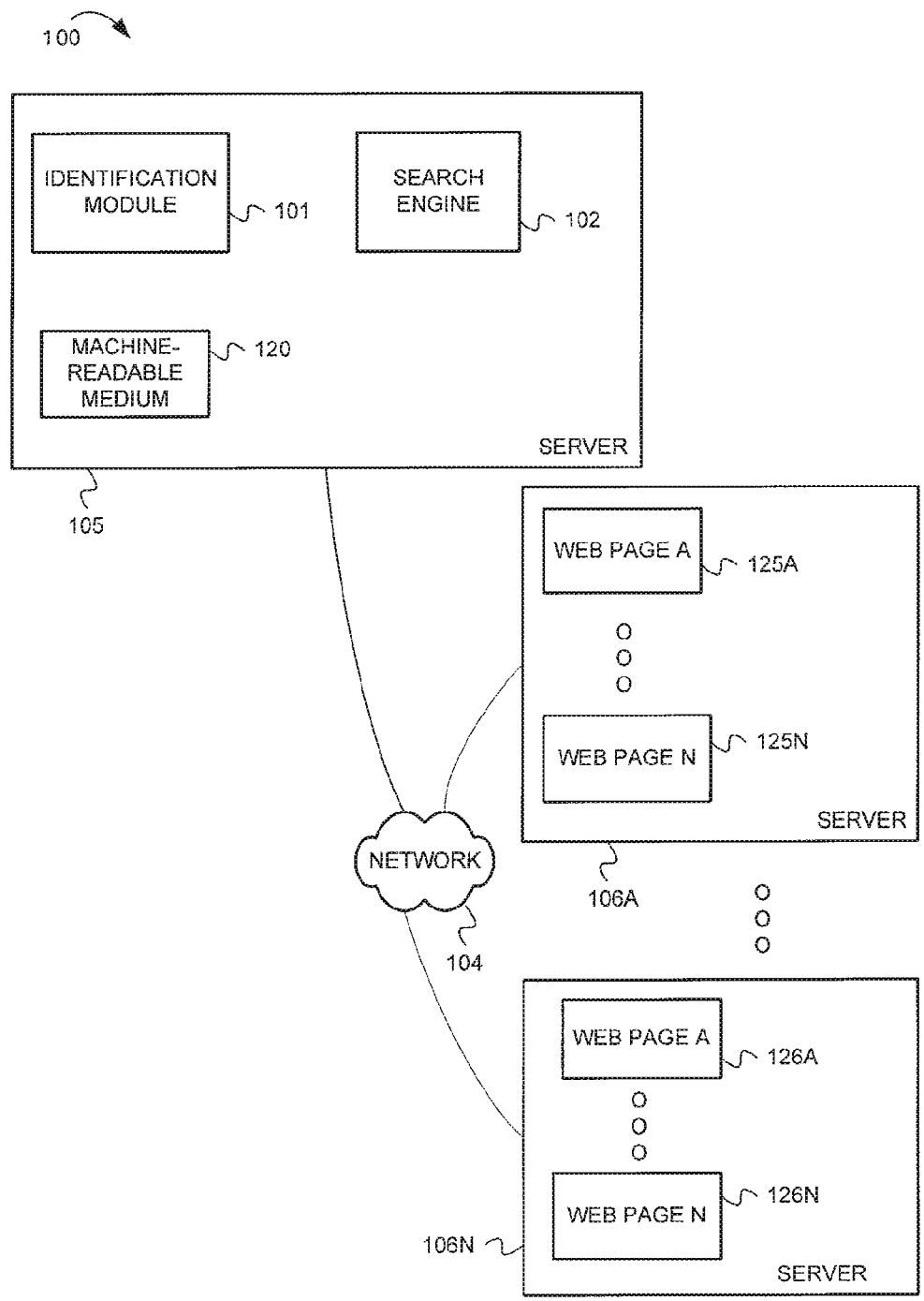
FIG. 1 is a network diagram of a system for identification of content and non-content sections in an electronic document (e.g., a web page), according to example embodiments.

Methods, apparatus and systems for identification of content in an electronic document are described. In the following description, numerous specific details are set forth. However, it is understood that embodiments of the invention may be practiced without these specific details. In other instances, structures and techniques have not been shown in detail in order not to obscure the understanding of this description.

Example embodiments are used to process sections of any type of electronic document to identify the content therein. The sections of an electronic document may be identified as including content or non-content. In the examples described herein, the electronic document is illustrated as a web page. However, embodiments may process any type of electronic document. For the purposes of this specification, an electronic document may be any type of electronic content for use in electronic form. Examples of an electronic document may comprise a web page, a editable document (such as a Microsoft® Word document), Portable Document Format ("PDF") which may be viewed and modified in one of the ADOBE® ACROBAT® programs, page-descriptive electronic content, hypertext document, a markup language document, declarative specification document (such as for example a hypertext markup language HTML or XML document), a fillable form or data describing application graphical user interface. Further, examples herein are to identify the blocks of an electronic document (e.g., a web page) as having content or non-content. However, embodiments may be used to identify any section or part of an electronic document.

In some embodiments, the sections (e.g., blocks) of an electronic document are identified as content or non-content sections. To illustrate, a web page typically contains information blocks. Apart from the content blocks, the web page may include a number of non-content blocks (such as, for example, navigation panels, banners, advertisements, copyright notices, privacy notices, etc.). Content for a web page may include a review or description of a product, a news story, etc. Such web pages may include one or more non-content blocks. For a web page having news, the non-content may include advertisements and navigation panels on the top or sides, copyright notices at the bottom, etc. These non-content blocks are useful for viewers of the web page. For example, the navigation panels and search blocks assist the viewers in navigating to other web pages or locating particular data on the web site, respectively. These non-content blocks are also useful for the owners of the web pages because of revenue (e.g., advertisements), notification (e.g., copyright notice), etc.

Example embodiments process the blocks of data of a web page to identify the content blocks and the non-content blocks. Various applications may use the differentiation between content and non-content blocks. For example, this differentiation of the blocks may be used by search engines. Search engines that process the content to enable searching of the web pages can be hindered by the non-content in the web pages. Specifically, search engines typically index the actual content in the web pages that is used for subsequent searches. Search engines generally do not need to process non-content data of a web page. Therefore, search engines may be able to parse the content blocks (located in accordance with example embodiments) of a web page (rather than both content and non-content blocks).

Example embodiments may be used for other applications. For example, the search engines may also use example embodiments to rank the relevance of web pages for a given search. Example embodiments may also be used to rank the content blocks of a web page relative to a search. Additionally, example embodiments may be used to determine which part of a web page to display. For example, some devices (such as Personal Digital Assistants (PDAs)) have limited bandwidth and/or display space. Accordingly, some embodiments may be used to display just the content blocks, the most important content block, etc.

FIG. 1 is a network diagram of a system for identification of content and non-content sections in an electronic document (e.g., a web page), according to example embodiments. A system 100 comprises a server 105 and servers 106A-106N that are coupled together through a network 104.

The server 105 comprises a search engine 102, an identification module 101 and a machine-readable medium 120. The identification module 101 may receive and process web pages from different web sites. The identification module 101 may identify the blocks of a web page as either content blocks or non-content blocks. In example embodiments, the identification module 101 performs this identification based on different properties of the block and the data therein. A more detailed description of these operations is set forth below. The search engine 102 may use the output from the operations of the identification module 101 to index the web pages for subsequent searches of such pages.

The machine-readable medium 120 may store various input and output for the operations performed by the identification module 101 and the search engine 102. For example, the machine-readable medium 120 may store web pages from various web sites, the identification of the content blocks and the non-content blocks for a web page that are a result of the processing by the identification module 101, the indexes of the web pages that are a result of the processing by the search engine 102, etc.

The server 106A may store on a machine-readable medium a number of web pages 125A-125N that may be for one to N number of web sites. The server 106N may store on a machine-readable medium a number of web pages 126A-126N that may be for one to N number of web sites. Such web pages may be processed by the search engine 102 and the identification module 101.

The system 100 may comprise any number of servers. While described such that the identification module 101, the search engine 102 and the associated data are in a same server, embodiments are not so limited. Alternatively or in addition, such components may be distributed across any number of network storage devices/servers.

The network communication may be any combination of wired and wireless communication. In some embodiments, the network communication may be based on one or more communication protocols (e.g., HyperText Transfer Protocol (HTTP), HTTP Secured (HTTPS), Real Time Messaging Protocol (RTMP), Real Time Messaging Protocol Secured/SSL (RTMPS) etc.). The identification module 101 and the search engine 102 may be software, hardware, firmware or a combination thereof for executing operations, according to some embodiments.

Figure 2:
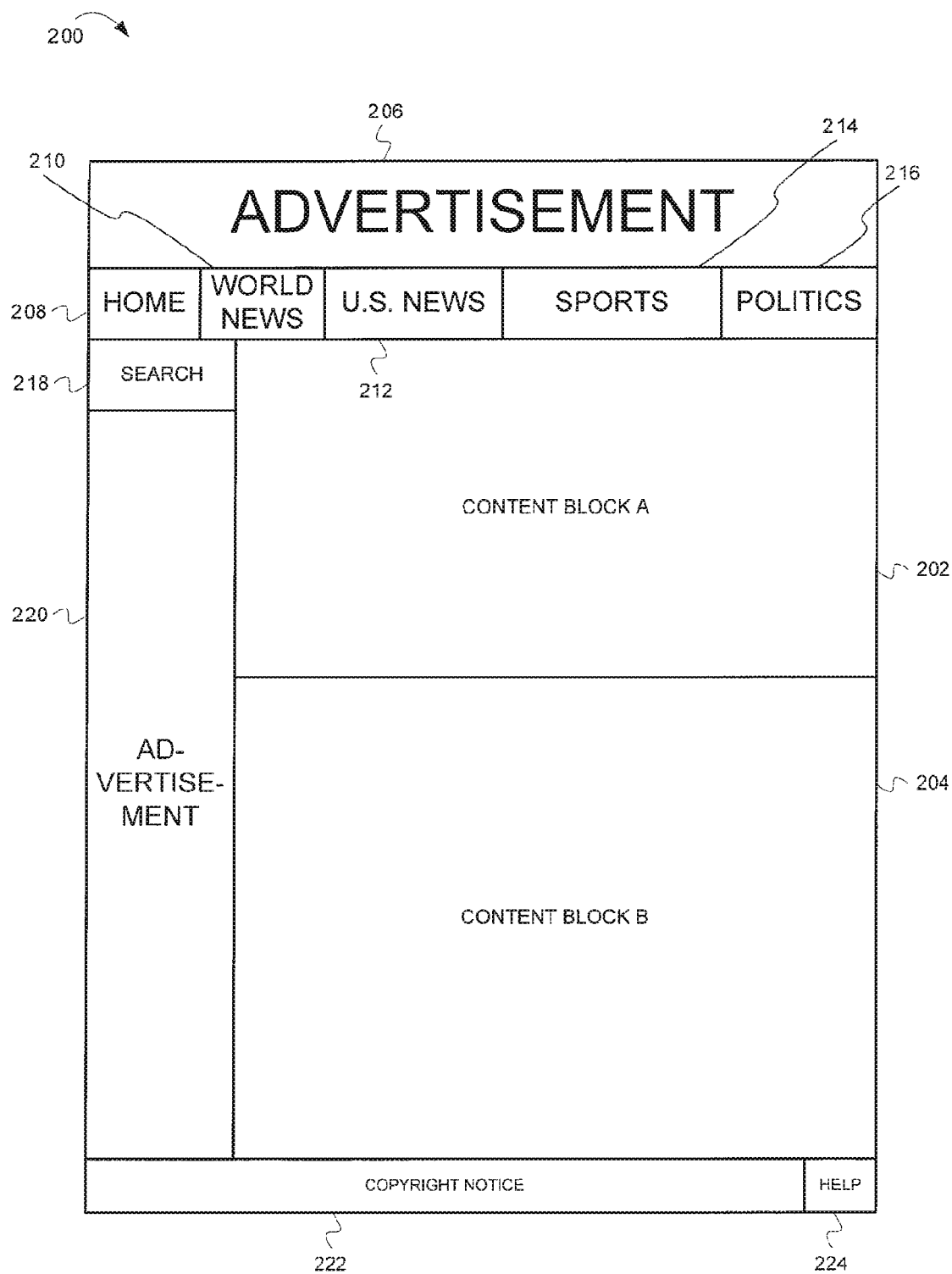
FIG. 2 is a web page having content and non-content blocks, according to example embodiments.

FIG. 2 is a web page having content and non-content blocks, according to example embodiments. A web page 200 may be representative of a web page that is typical for a web site that provides news. However, embodiments may be performed on any type of web page (e.g., news, product reviews, data about an organization, etc.). The web page 200 includes two content blocks (content block A 202 and content block B 204). The content block A 202, and the content block B 204 may contain a new story, editorial, etc. The web page 200 also includes a number of non-content blocks. A non-content block 206 and a non-content block 220 are blocks for advertisements. Non-content blocks 208, 210, 212, 214 and 216 are parts of a navigation panel that enables a view of the web page 200 to navigate to a different web page on the web site. In this example, the navigation panel enables the user to traverse other types of news. Selection of the non-content block 208 enables a viewer to return to the home web page for the web site. Selection of the non-content block 210 enables a viewer to view a web page related to world news. Selection of the non-content block 212 enables a viewer to view a web page related to news for the United States. Selection of the non-content block 214 enables a viewer to view a web page related to sports. Selection of the non-content block 216 enables a viewer to view a web page related to politics.

A non-content block 218 is a block of the web page 200 that enables viewers to enter a search for data on this particular web site, for data across the Internet, etc. A non-content block 222 is block that displays the copyright notice for the web page 200. A non-content block 224 is a block that provides a hyperlink to a help page.

Figure 3:
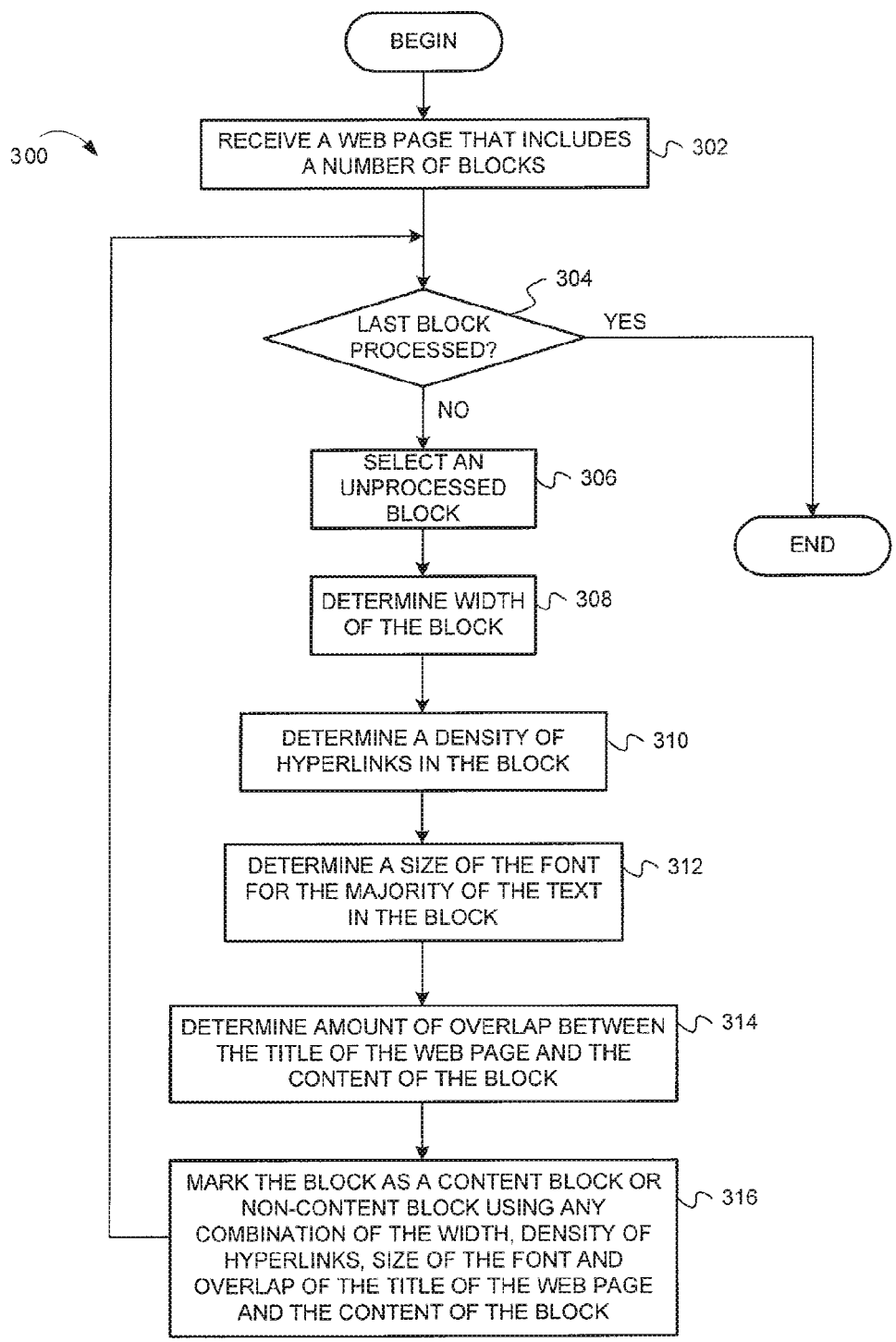
FIG. 3 is a diagram of a method for determining whether a block is a content block or a non-content block in a web page, according to example embodiments.

Operations, according to example embodiments, are now described. In certain embodiments, the operations are performed by instructions residing on machine-readable media (e.g., software), while in other embodiments, the methods are performed by hardware or other logic (e.g., digital logic). FIG. 3 is a diagram of a method 300 for determining whether a block is a content block or a non-content block in a web page, according to example embodiments. The method 300 is described with reference to FIGS. 1-2 in some embodiments, the method 300 is performed by the identification module 101. In example embodiments, the operations of the method 300 may be performed independent or dependent from the operations of the search engine 102. For example, the search engine 102 may initiate the operations of the method 300 to determine the content blocks within one or more web pages. The search engine 102 may then process these content blocks to index the data therein for subsequent searches. Alternatively, the operations of the method 300 may be performed without initiation by the search engine 102. Other applications may use the determination of the content blocks for a web page (as described above). The method 300 commences at block 302.

At block 302, the identification module 101 receives a web page that includes a number of blocks. The blocks of the web page may be content and/or non-content blocks. While described as processing one web page, example embodiments may be performed on any number of pages. The method 300 continues at block 304.

At block 304, the identification module 101 determines whether the last block for the web page has been processed. The identification module 101 determines whether the blocks in the web page have been processed to determine whether the blocks include content or non-content. If the last block has been processed, the operations of the method 300 are complete. Otherwise control continues at block 306.

At block 306, the identification module 101 selects an unprocessed block on the web page for processing. The method 300 continues at block 308.

At block 308, the identification module 101 determines a width of the selected block, in example embodiments, a width of the block is indicative of whether the block includes content or non-content. In some embodiments, if the width of the block is less than X % of the width of the page, the block may be considered not likely to include content. In some embodiments, X equals 20, 25, 30, 15, 10, etc. With reference to FIG. 2 to illustrate, the blocks along the sides of the web page 200 (such as blocks 218 and 220) and the blocks in the navigation panel (blocks 208, 210, 212, 214 and 216) generally have a small width relative to the width of the web page. As further described below, based on a number of factors including a width of the block, the identification module 101 marks a block as having content or non-content. In some embodiments, the identification module 101 assigns a value to a block based on its width. In particular, if a width of a block is greater than X %, the block is likely to include content. In some embodiments, if a width of the block is greater than X %, the block is assigned a value of '+1'. If a width of the block is less than or equal to X %, the block is assigned a value of '−1'. Thus, in some embodiments, the block is assigned a value (e.g., '+1' or '−1') based on its width. As further described below, this assigned values are used to score the blocks to determine whether or not the blocks include content. The method 300 continues at block 310.

At block 310, the identification module 101 determines a density of hyperlinks in the selected block. In some embodiments, the identification module 101 determines the density of hyperlinks based on a ratio of data that are not hyperlinks (considered content) to data that are hyperlinks (considered non-content). In some embodiments, if this ratio of content to non-content is less than N %, the block is considered not likely to include content. In some embodiments, N equals 20, 25, 30, 15, 10, etc. Thus, in some embodiments, the block is assigned a value (e.g., or '−1') based on its density of hyperlinks. The method 300 continues at block 312.

At block 312, the identification module 101 determines a size of the font for text in the block. In some embodiments, the size of the font for text in a block may be the majority size of the font for text therein. In some embodiments, the majority size of the font for text may be the weighted average of the text in the block. The identification module 101 may compare the majority size of the font for text in the block to the majority size of the font of the text in the web page. The majority of the size of the font of the text in the web page may be defined as the weighted average of the size of the font of the text in the web page. In example embodiments, if the size of the font of the block is significantly different from the size of the font of the web page, the block may be less likely to include content. For example, if the size of the font of the block is significantly smaller, the block may be the copyright or privacy notices at the bottom of the web page. Further, if the size of the font of the block is significantly larger, the block may be advertising. Thus, if the difference between the font size of the text in the block and the font size of the text in the web page is beyond a threshold, the block is not considered to include content.

Alternatively or in addition, the identification module 101 may determine a size of the font for text in the block, independent of a size of the font for text in the web page. In example embodiments, the size of the font is indicative of whether the block includes content or non-content. In some embodiments, the larger the size of the font the more likely that the block includes non-content. For example, if the size of the font for a majority of the data is greater than M point, the block may be considered not likely to include content. In some embodiments, M equals 10, 11, 12, 14, 8 or 9. In some embodiments, if the size of the font is within a given range, the block is more likely to include content. For example, if the size of the font is large, the block may be an advertisement. If the size of the font is small, the block may be a copyright notice, privacy notice, help button, etc. In example embodiments, if the size of the font for the majority of the data is within a range, the block may be considered likely to include content. In some embodiments, the range of the size of the font for the block likely to include content includes 8-10 point, 8-11 point, 8-10 point, 8-14 point, 9-10 point, 9-11 point, 9-12 point, 9-14 point, 10-11 point, 10-12 point, 10-14 point, 11-12 point, 11-14 point, 12-14 point, etc. Thus, in some embodiments, the block is assigned a value (e.g., '+1' or '−1', as described above) based on the size of the font. The method 300 continues at block 314.

At block 314, the identification module 101 determines the amount of overlap between a title of the web page and the content of the block. In some embodiments, web pages generally have a title. For example, for a web page including a product review, the title may be the name of the product. In some embodiments, if the title of the web page is within the block, the block is more likely to include content. In particular, the title of the web page is generally not within panel buttons, advertisements, copyright notice, etc. In some embodiments, if the entire title verbatim is within the block, the block is more likely to include content. In some embodiments, if a part of the title is within the block, the block is more likely to include content. For example, if all or some descriptive words are within the block, the block is more likely to include content. To illustrate, non-descriptive words may include "the", "a", "an" "or", etc. In some embodiments, non-descriptive words may be identified using a stop word dictionary (which is generated by considered the frequency of the word in a particular language). Examples of stop words in English include "the", "a", "an" "or", etc. because of their frequent use in the language. Thus, if a word is not within the stop word dictionary, such word may be considered descriptive. Alternatively or in addition, a word may be considered descriptive if the number of letters in the word exceeds a threshold. For example, if the number of letters is greater than 3, the word is considered descriptive. Thus, in some embodiments, the block is assigned a value (e.g., '+1' or '−1') based on whether the title of the web page is included within the block. The method 300 continues at block 316.

At block 316, the identification module 101 marks the block as a content block or non-content block using any combination of the width of the block, the density of the hyperlinks in the block, the size of the font for the majority of text in the block and the overlap of the title of the web page and the content of the block. In some embodiments, all of these different attributes are used to make the determination. Alternatively, one or less than all of these attributes is used to make the determination. In some embodiments, the identification module 101 may assign a score to the block based on some or all of these attributes. If the score exceeds a threshold, the block is considered to have content. For example, if the width exceeds a threshold, the block receives a +1. Otherwise, the block receives a −1. The identification module may similarly assign +1 and −1 for the other attributes being considered. In some embodiments, only one attribute is used. Accordingly, if the given attribute for the block is indicative of the block having content, the identification module marks the block as a content block. The method 300 continues at block 304. Once the blocks of the web page have been processed, the operations of the method 300 are complete.

Embodiments are not limited to the attributes for a block described above. For example, some embodiments may determine whether a block includes content based on its position on the web page. In some embodiments, a block is more likely to include content the closer that such block is to the center of the web page (horizontally, vertically or a combination thereof).

Figure 4:
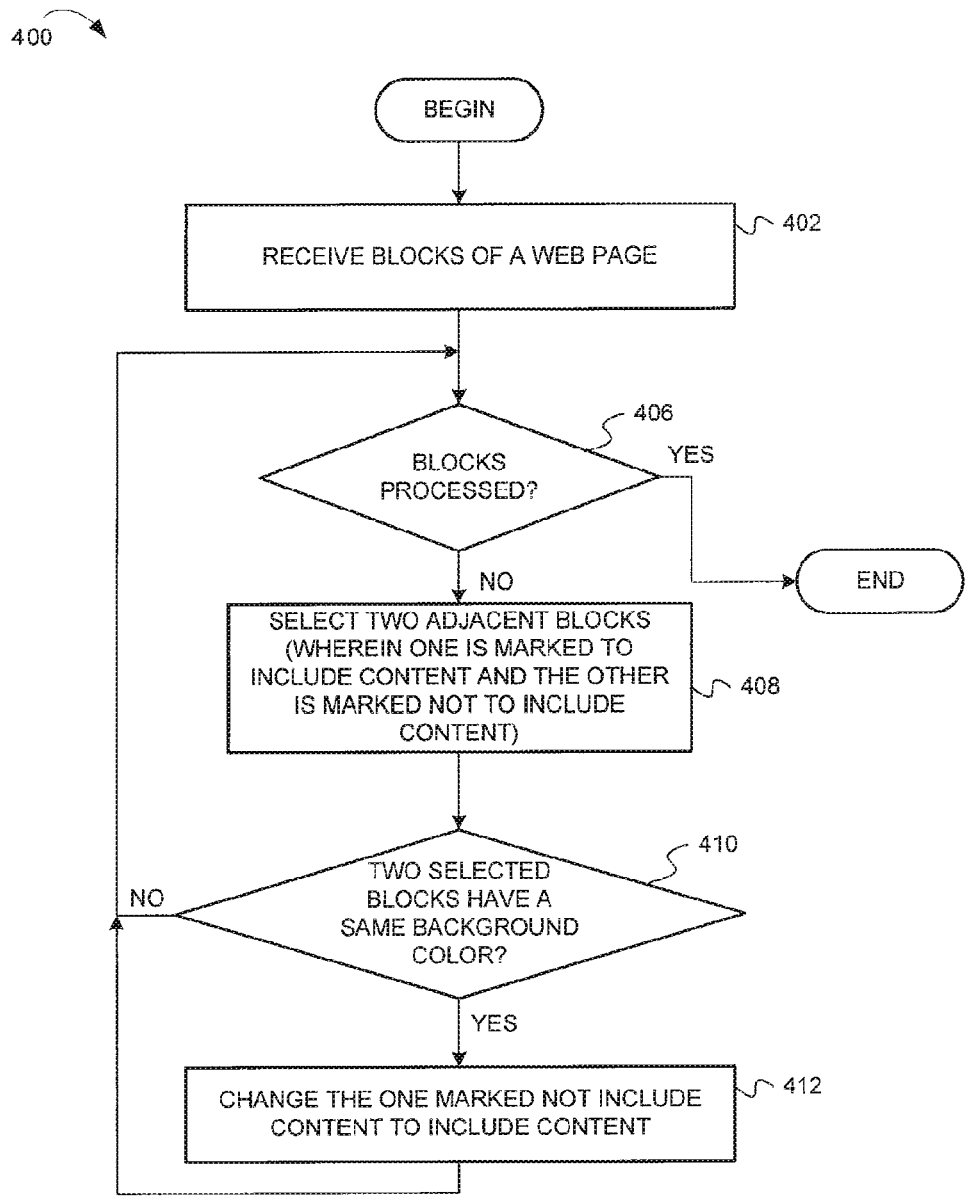
FIG. 4 is a diagram of a method for determining whether a block of a web page includes content or non-content based on comparison of attributes across blocks, according to example embodiments.
Figure 5:
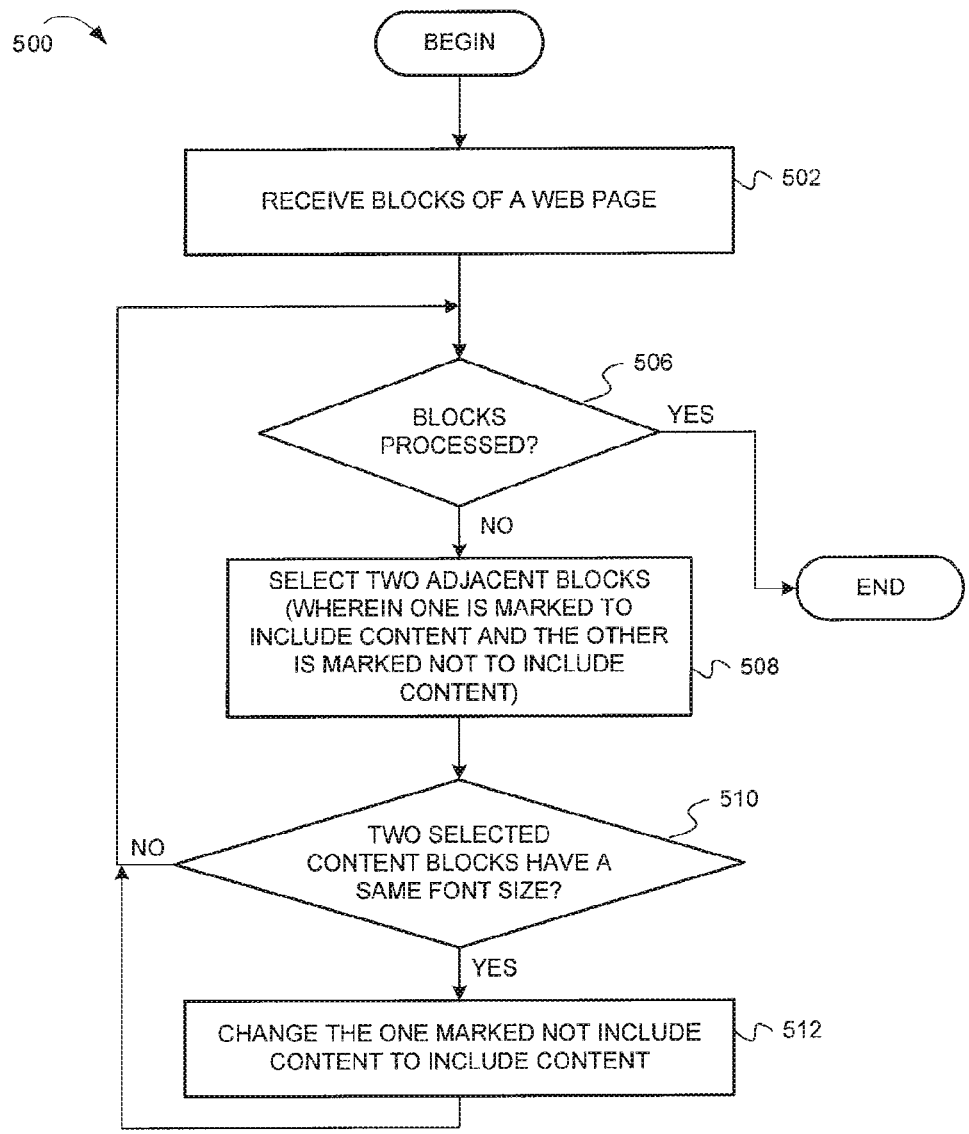
FIG. 5 is a diagram of a method for determining whether a block of a web page includes content or non-content based on comparison of attributes across blocks, according to some other example embodiments.
Figure 6:
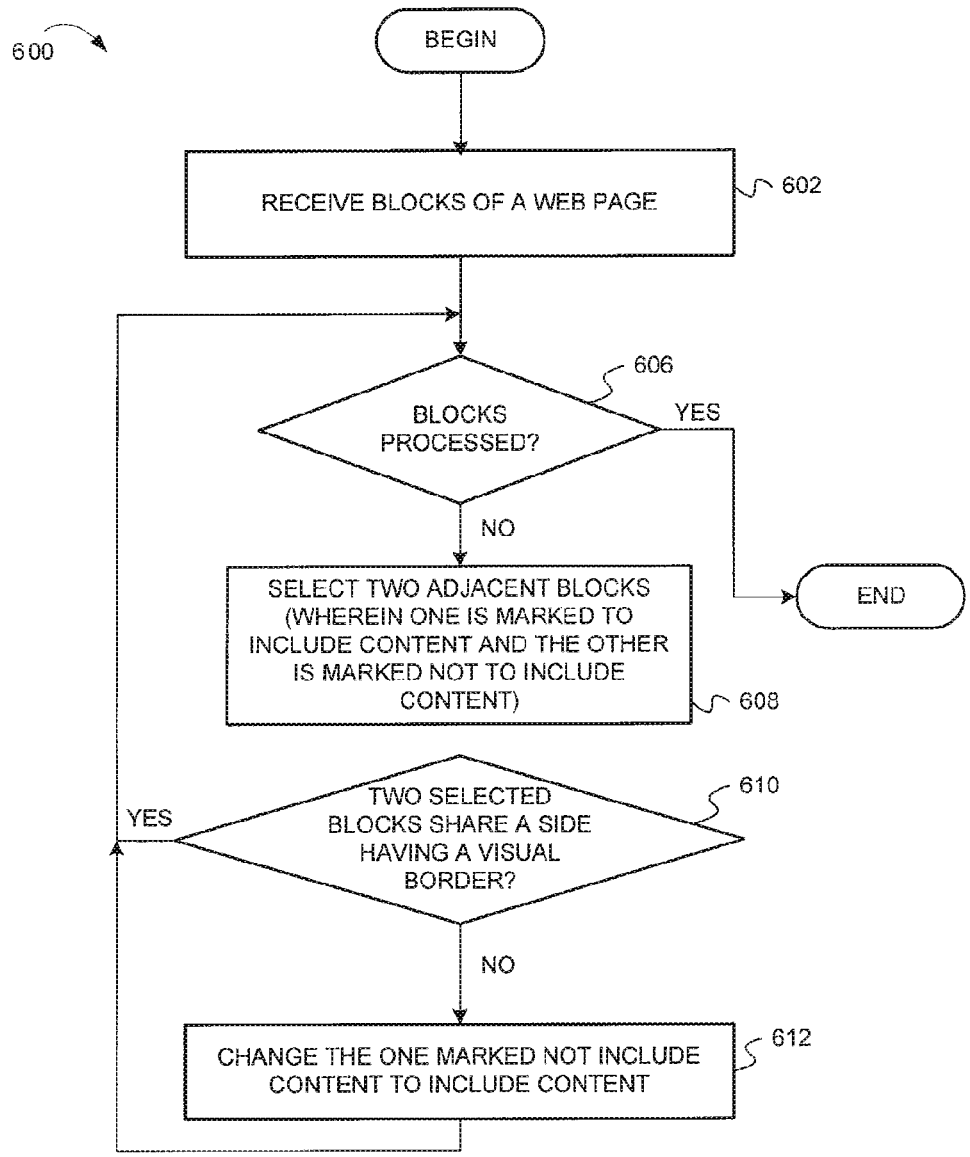
FIG. 6 is a diagram of a method for determining whether a block of a web page includes content or non-content based on borders of adjacent blocks, according to some example embodiments.

In some embodiments, additional checks are performed to determine if the block includes content. In some embodiments, attributes of a block are compared across multiple blocks of a web page. In some embodiments, it is assumed that content blocks have similar or same attributes. Accordingly in some embodiments, if attributes across adjacent blocks are similar (wherein one block is marked to include content and the other block is marked to not include content), both blocks are considered to include content. FIGS. 4-6 illustrate different operations for this check of attributes across multiple blocks.

FIG. 4 is a diagram of a method 400 for determining whether a block of a web page includes content or non-content based on comparison of attributes across blocks, according to example embodiments. The method 400 is described with reference to FIGS. 1-2. In some embodiments, the method 400 is performed by the identification module 101. In some embodiments, the method uses the output of the method 300 of FIG. 3 and is thus performed after such operations. In particular, the operations of the method 400 may serve as an additional check on whether the block of a web page includes content or non-content.

In example embodiments, the operations of the method 400 may be performed independent or dependent from the operations of the search engine 102. For example, the search engine 102 may initiate the operations of the method 400 to determine the content blocks within one or more web pages. The search engine 102 may then process these content blocks to index the data therein for subsequent searches. Alternatively or in addition, the operations of the method 400 may be performed without initiation by the search engine 102. Other applications may use the determination of the content blocks for a web page (as described above). The method 400 commences at block 402.

At block 402, the identification module 101 receives blocks of a web page. In some embodiments, such blocks are received from the output of the operations of the method 300. However, embodiments are not so limited, as operations of the method 400 may receive the blocks from the output of other types of algorithms (that identify blocks has including or not including content). In particular, in some embodiments, the operations of the method 400 may be performed independent of the operations of the method 300. The method 300 continues at block 406.

At block 406, the identification module 101 determines whether the blocks of the web page have been processed. As further described below, in some embodiments, an attribute for two blocks (one marked to include content and the other not marked to include content) is compared. If the attributes are the same, the block marked not to include content is changed to include content. For example, assume that block A and block B are adjacent to each other. Block A may have been marked to include content. However, block B may be marked to not include content because the width of the block is too small. If block A and block B are similar in terms of font size, density of hyperlinks, etc., block B may include content. For example, for consumer review of a product, the web page may include a table with multiple columns that may be representative of blocks in a web page. The table may include a large-width column showing the actual text of the review and a small-width column showing the name of the author, rating of the author, etc. The small-width column is part of the content and should be marked as having content. Accordingly, blocks that are adjacent to each other (wherein one is marked to include content and the other is not marked to include content) may be compared before the operations of the method 400 are complete. If the blocks are processed, the operations of the method 400 are complete. Otherwise, the method 300 continues at block 408.

At block 408, the identification module 101 selects two adjacent blocks (wherein one is marked to include content and the other is not marked to include content). These blocks may or may not have yet been compared to a different block. For example, block A (that is adjacent to block B) may be processed again to be compared to block C (that is also adjacent to block A). The method 300 continues at block 410.

At block 410, the identification module 101 determines whether the two selected blocks have a same background color. In some embodiments, it is assumed that blocks having content in a given web page have a same background color. Accordingly, if two adjacent blocks (wherein one is marked to include content and the other is marked to not include content) have a same background color, in some embodiments, it is assumed that the one marked to not include content has not been marked correctly. This non-content block is then changed to be marked to include content. If the background colors are the same, the method 300 continues at block 412. Otherwise, the method 300 continues at block 406.

At block 412, the identification module 101 changes the block marked to not include content to be marked to include content. In particular in some embodiments, because the background color of adjacent blocks (wherein one is marked to include content and the other is marked to not include content) is the same, both blocks may be marked to include content. The method 300 continues at block 406. Accordingly, the operations of the method 400 continue until the blocks are processed.

Alternatively or in addition, other attributes may be checked across adjacent blocks to determine if the blocks include content. FIG. 5 is a diagram of a method 500 for determining whether a block of a web page includes content or non-content based on comparison of attributes across blocks, according to some other example embodiments. The method 500 is described with reference to FIGS. 1-2. In some embodiments, the method 500 is performed by the identification module 101. In some embodiments, the method uses the output of the method 300 of FIG. 3 and is thus performed after such operations. In particular, the operations of the method 500 may serve as an additional check on whether the block of a web page includes content or non-content.

In example embodiments, the operations of the method 500 may be performed independent or dependent from the operations of the search engine 102. For example, the search engine 102 may initiate the operations of the method 500 to determine the content blocks within one or more web pages. The search engine 102 may then process these content blocks to index the data therein for subsequent searches. Alternatively or in addition, the operations of the method 500 may be performed without initiation by the search engine 102. Other applications may use the determination of the content blocks for a web page (as described above). The method 500 commences at block 502.

At block 502, the identification module 101 receives blocks of a web page. In some embodiments, such blocks are received from the output of the operations of the method 300. However, embodiments are not so limited, as operations of the method 400 may receive the blocks from the output of other types of algorithms (that identify blocks has including or not including content). In particular, in some embodiments, the operations of the method 400 may be performed independent of the operations of the method 300. The method 300 continues at block 506.

At block 506, the identification module 101 determines whether the blocks of the web page have been processed. As described above, in some embodiments, an attribute for two blocks (one marked to include content and the other not marked to include content) is compared. If the attributes are the same, the block marked not to include content is changed to include content. Accordingly, blocks that are adjacent to each other (wherein one is marked to include content and the other is not marked to include content) may be compared before the operations of the method 500 are complete. If the blocks are processed, the operations of the method 500 are complete. Otherwise, the method 300 continues at block 508.

At block 508, the identification module 101 selects two adjacent blocks (wherein one is marked to include content and the other is not marked to include content). These blocks may or may not have yet been compared to a different block. For example, block A (that is adjacent to block B) may be processed again to be compared to block C (that is also adjacent to block A). The method 300 continues at block 510.

At block 510, the identification module 101 determines whether the two selected blocks have a same font size. In some embodiments, it is assumed that blocks having content in a given web page have a same font size. While described based on a comparison of the size of the font, in some embodiments other attributes of the content may be used. For example, the identification module 101 may compare the color of the text, whether the text is bolded, italicized, underlined, etc. Accordingly, if two adjacent blocks (wherein one is marked to include content and the other is marked to not include content) have a same font size, in some embodiments, it is assumed that the one marked to not include content has not been marked correctly. This non-content block is then changed to be marked to include content. If the font sizes are the same, the method 300 continues at block 512. Otherwise, the method 300 continues at block 506.

At block 512, the identification module 101 changes the block marked to not include content to be marked to include content. In particular in some embodiments, because the font size of adjacent blocks (wherein one is marked to include content and the other is marked to not include content) is the same, both blocks may be marked to include content. The method 300 continues at block 406. Accordingly, the operations of the method 400 continue until the blocks are processed.

Alternatively or in addition, other attributes relative to multiple content blocks may be checked to determine if the blocks include content. FIG. 6 is a diagram of a method 500 for determining whether a block of a web page includes content or non-content based on borders of adjacent blocks, according to some example embodiments. The method 600 is described with reference to FIGS. 1-2. In some embodiments, the method 600 is performed by the identification module 101. In some embodiments, the method uses the output of the method 300 of FIG. 3 and is thus performed after such operations. In particular, the operations of the method 600 may serve as an additional check on whether the block of a web page includes content or non-content.

In example embodiments, the operations of the method 600 may be performed independent or dependent from the operations of the search engine 102. For example, the search engine 102 may initiate the operations of the method 600 to determine the content blocks within one or more web pages. The search engine 102 may then process these content blocks to index the data therein for subsequent searches. Alternatively or in addition, the operations of the method 600 may be performed without initiation by the search engine 102. Other applications may use the determination of the content blocks for a web page (as described above). The method 600 commences at block 602.

At block 602, the identification module 101 receives blocks of a web page. In some embodiments, such blocks are received from the output of the operations of the method 300. However, embodiments are not so limited, as operations of the method 400 may receive the blocks from the output of other types of algorithms (that identify blocks has including or not including content). In particular, in some embodiments, the operations of the method 400 may be performed independent of the operations of the method 300. The method 300 continues at block 606.

At block 606, the identification module 101 determines whether the blocks of the web page have been processed. As further described below, in some embodiments, a determination is made regarding a border between adjacent blocks (one marked to include content and the other not marked to include content). Accordingly, blocks that are adjacent to each other (wherein one is marked to include content and the other is not marked to include content) may be processed before the operations of the method 600 are complete. If the blocks are processed, the operations of the method 600 are complete. Otherwise, the method 300 continues at block 608.

At block 608, the identification module 101 selects two adjacent blocks (wherein one is marked to include content and the other is not marked to include content). These blocks may or may not have yet been compared to a different block. For example, block A (that is adjacent to block B) may be processed again to be compared to block C (that is also adjacent to block A). The method 300 continues at block 610.

At block 610, the identification module 101 determines whether the two selected adjacent blocks share a side that includes a visual border. For example, the shared side may include a bolded line between the two blocks. In some embodiments, it is assumed that if two adjacent blocks have a visual border, only one of the two blocks include content. If the shared side does not include a visual border, the method 300 continues at block 606. Otherwise, the method 300 continues at block 612.

At block 612, the identification module 101 changes one of the selected content blocks (that is less likely to include content) to be marked as a non-content block. In some embodiments, the identification module 101 uses the score assigned to the content blocks while the blocks were initially marked as having content (in the operations of the method 300) (as described above for the description of the method 400) (of FIG. 4). The method 300 continues at block 606.

Accordingly, the operations of the method 600 continue until all content blocks are processed.

Embodiments are not limited to the attributes across two adjacent blocks described above. For example, some embodiments may determine that two adjacent blocks both include content based on the height of the blocks. In some embodiments, if two adjacent blocks are the same or similar height, both blocks are marked to include content.

FIGS. 4-6 illustrate operations for checking whether blocks include content. These operations may be performed independent of each other. Alternatively, these operations may be performed in any combination. For example, the operations of FIGS. 4-6 may be performed together, the operations of FIG. 4-5 may be performed together, the operations of FIGS. 4 and 6 may be performed together, etc.

FIGS. 3-6 have been described such that various attributes of blocks of a web page or attributes of the web page are compared to thresholds (e.g., width, size of font, etc.). In some embodiments, an optimization approach is used to locate the content blocks of a web page. The blocks that include content may be identified relative to the other blocks of the web page. The blocks may be sorted according to their likelihood of being content. Accordingly, the likelihood that a block includes content could be approximated by a function of the value of the different attributes considered. For example, a likelihood measure that a block includes content could be a summation, product or other mathematical function based on the width of the block, density of hyperlinks in the block, and overlap of the title of the web page in the block.

Figure 7:
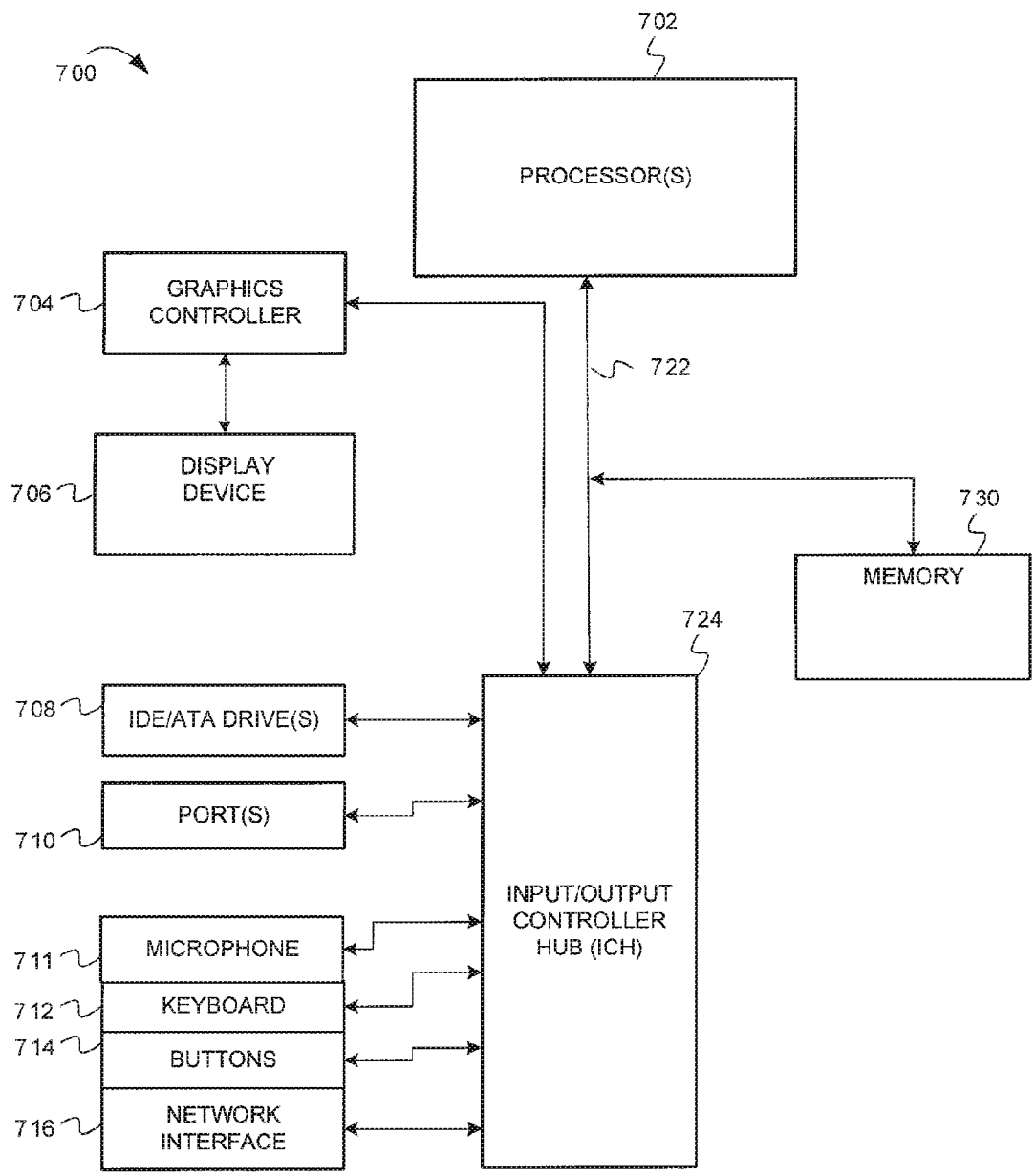
FIG. 7 illustrates a computer that may be used for identification of content and non-content sections in an electronic document, according to example embodiments.

A detailed block diagram of an example computer environment, according to some embodiments, is now described. In particular, FIG. 7 illustrates a computer that may be used for identification of content and non-content sections in an electronic document, according to example embodiments. A computer system 700 may be representative of one of the devices, the servers, etc.

As illustrated in FIG. 7, the computer system 700 comprises processor(s) 702. The computer system 700 also includes a memory unit 730, processor bus 722, and Input/Output controller hub (ICH) 724. The processor(s) 702, memory unit 730, and ICH 724 are coupled to the processor bus 722. The processor(s) 702 may comprise any suitable processor architecture. The computer system 700 may comprise one, two, three, or more processors, any of which may execute a set of instructions in accordance with embodiments of the invention.

The memory unit 730 may store data and/or instructions, and may comprise any suitable memory, such as a dynamic random access memory (DRAM). The computer system 700 also includes IDE drive(s) 708 and/or other suitable storage devices. A graphics controller 704 controls the display of information on a display device 706, according to some embodiments of the invention.

The input/output controller hub (ICH) 724 provides an interface to I/O devices or peripheral components for the computer system 700. The ICH 724 may comprise any suitable interface controller to provide for any suitable communication link to the processor(s) 702, memory unit 730 and/or to any suitable device or component in communication with the ICH 724. For one embodiment of the invention, the ICH 724 provides suitable arbitration and buffering for each interface.

For some embodiments of the invention, the ICH 724 provides an interface to one or more suitable integrated drive electronics (IDE) drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, a mouse 714, a CD-ROM drive 718, one or more suitable devices through one or more Firewire ports 716. For one embodiment of the invention, the ICH 724 also provides a network interface 720 though which the computer system 700 can communicate with other computers and/or devices.

In some embodiments, the computer system 700 includes a machine-readable medium that stores a set of instructions (e.g., software) embodying any one, or all, of the methodologies for described herein. Furthermore, software may reside, completely or at least partially, within memory unit 730 and/or within the processor(s) 702.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:

determining, by one or more hardware processors, that an attribute of a first section of an electronic document is similar to an attribute of a second section of the electronic document;

changing, by the one or more hardware processors, a first marking assigned to the first section of the electronic document indicating that the first section does not include content to a second marking indicating that the first section includes content based at least in part on the determining that the attribute of the first section of the electronic document is similar to the attribute of the second section of the electronic document, the second section not including the first section; and outputting, by the one or more hardware processors, the electronic document including the first section of the electronic document marked as including content.

2. The method of claim 1, further comprising:

calculating a score that corresponds to the first section of the electronic document, the calculating being performed based on one or more attributes of the first section;

comparing the calculated score that corresponds to the first section to a predetermined threshold;

marking the first section as including content based at least in part on the comparison;

calculating a second score that corresponds to the second section of the electronic document;

comparing the calculated second score to the predetermined threshold; and marking the second section as not including content based on the comparison.

3. The method of claim 2, wherein the second section includes a button that is selectable to view a section of a web page that includes content.

4. The method of claim 2, wherein the calculating of the score includes determining a number of words in a title of the electronic document, the first section being the title.

5. The method of claim 2, wherein the calculating of the score includes determining a width of the first section.

6. The method of claim 2, wherein the calculating of the score includes determining a density of hyperlinks included in the first section.

7. The method of claim 2, wherein the calculating of the score includes determining a font size for a majority of text included in the first section.

8. The method of claim 1, wherein:

the attribute includes a background color; and the determining includes determining that a background color of the first section matches a background color of the second section.

9. The method of claim 1, further comprising:

receiving, from a search engine, a request for the electronic document; and providing, in response to the request, the electronic document to the search engine.

10. A system comprising:

one or more hardware processors and executable instructions accessible on a computer-readable medium that, when executed, configure the one or more hardware processors to perform operations comprising:

determining that an attribute of a first section of an electronic document is similar to an attribute of a second section of the electronic document;

changing a first marking assigned to the first section of the electronic document indicating that the first section does not include content to a second marking indicating that the first section includes content based at least in part on the determining that the attribute of the first section of the electronic document is similar to the attribute of the second section of the electronic document, the second section not including the first section; and outputting the electronic document including the first section of the electronic document marked as including content.

11. The system of claim 10, the operations further comprising:

calculating a score that corresponds to the first section of the electronic document, the calculating being performed based on one or more attributes of the first section;

comparing the calculated score to a predetermined threshold; and marking the first section as including content based at least in part on the comparison;

calculating a second score based on the second section of the electronic document;

comparing the second score to the predetermined threshold; and marking the second section as not including content based on the comparison.

12. The system of claim 11, wherein the second section includes a button that is selectable to view a section of a web page that includes content.

13. The system of claim 11, wherein the calculating of the score comprises determining a width of the first section.

14. The system of claim 11, wherein the calculating of the score comprises:

determining a density of hyperlinks included in the first section; and determining a font size for a majority of text included in the first section.

15. The system of claim 10, wherein the attribute includes a background color, and the operations further comprise determining that a background color of the first section matches a background color of the second section.

16. The system of claim 10, the operations further comprising:

receiving, from a search engine, a request for the electronic document; and providing, in response to the request, the electronic document to the search engine.

17. A non-transitory machine-readable medium storing instructions that, when executed by one or more processors of a machine, cause the machine to perform operations comprising:

determining that an attribute of a first section of an electronic document is similar to an attribute of a second section of the electronic document;

changing a first marking assigned to the first section of the electronic document indicating that the first section does not include content to a second marking indicating that the first section includes content based at least in part on the determining that the attribute of the first section of the electronic document is similar to the attribute of the second section of the electronic document, the second section not including the first section; and outputting the electronic document including the first section of the electronic document marked as including content.

18. The non-transitory machine-readable medium of claim 17, the operations further comprising:
calculating a score that corresponds to the first section of the electronic document, the calculating being performed based on one or more attributes of the first section;
comparing the calculated score to a predetermined threshold;
marking the first section as including content based at least in part on the comparison;
calculating a second score based on the second section of the electronic document;
comparing the second score to the predetermined threshold; and
marking the second section as not including content based on the comparison.

19. The non-transitory machine-readable medium of claim 18, wherein the calculating of the score comprises:
determining a width of the first section;
determining a density of hyperlinks included in the first section; and determining a font size for a majority of text included in the first section.

20. The non-transitory machine-readable medium of claim 17, the operations further comprising:
receiving, from a search engine, a request for the electronic document; and
providing, in response to the request, the electronic document to the search engine.

* * * * *